(12) United States Patent
Lamesch et al.

(10) Patent No.: US 8,729,430 B2
(45) Date of Patent: May 20, 2014

(54) SEAT HEATER AND CAPACITIVE OCCUPANCY SENSOR COMBINATION

(75) Inventors: Laurent Lamesch, Reichlange (LU);
Michael Virnich, Korlingen (DE);
Aloyse Schoos, Beitrange (LU)

(73) Assignee: IEE International Electronics & Engineering S.A. (LU)

( * ) Notice: Subject to any disclaimer, the term of this patent is extended or adjusted under 35 U.S.C. 154(b) by 0 days.

(21) Appl. No.: 13/637,189

(22) PCT Filed: Mar. 22, 2011

(86) PCT No.: PCT/EP2011/054346
§ 371 (c)(1),
(2), (4) Date: Sep. 25, 2012

(87) PCT Pub. No.: WO2011/117238
PCT Pub. Date: Sep. 29, 2011

(65) Prior Publication Data
US 2013/0020305 A1    Jan. 24, 2013

(30) Foreign Application Priority Data

Mar. 25, 2010 (EP) .................................. 10157802

(51) Int. Cl.
*H05B 1/00* (2006.01)
(52) U.S. Cl.
USPC ........................................................ 219/217
(58) Field of Classification Search
USPC ................... 219/217, 200, 201, 496; 324/686
See application file for complete search history.

(56) References Cited

U.S. PATENT DOCUMENTS

| 3,705,365 | A | * | 12/1972 | Szabo et al. ..................... 333/12 |
| 4,104,715 | A | * | 8/1978 | Lawson, Jr. ..................... 363/37 |
| 4,363,008 | A | * | 12/1982 | Chambers, Jr. ............. 333/24 R |

(Continued)

FOREIGN PATENT DOCUMENTS

| DE | 102009055424 A1 | 7/2011 |
| EP | 1553699 A1 | 7/2005 |

(Continued)

OTHER PUBLICATIONS

Joshua Smith, "Electric Field Sensing for Graphical Interfaces" IEEE Computer Graphics and Applications, published in Computer Graphics I/O Devices, Issue May/Jun. 1998, pp. 54-60.

(Continued)

*Primary Examiner* — Dana Ross
*Assistant Examiner* — Renee L Miller
(74) *Attorney, Agent, or Firm* — Cantor Colburn LLP

(57) ABSTRACT

A combined seat heater and capacitive occupancy sensor comprises a heater network and a capacitive sensing network. The heater network includes a heating element (10) connected between a first node (21) and a second node (22) to dissipate heat. The capacitive sensing network is connected to the heating element to apply an oscillating current thereto and to derive a capacitive load of the heating element from the voltage resulting on the heating element. The heater network comprises a common mode choke (16) connecting the first and the second node to a third (23) and a fourth (24) node, respectively. The capacitive sensing network further comprises means to sustain the oscillating current in or to drive the oscillating current into the heating element as well as a high-impedance amplifier (32) having an input node operatively connected to the heating element to probe the resulting voltage, and an output node (44) to provide an output signal indicative of the voltage.

17 Claims, 8 Drawing Sheets

(56) References Cited

U.S. PATENT DOCUMENTS

| | | | |
|---|---|---|---|
| 6,161,070 A | 12/2000 | Jinno et al. | |
| 6,392,542 B1 | 5/2002 | Stanley | |
| 6,661,115 B2 * | 12/2003 | Lester | 307/10.1 |
| 6,703,845 B2 * | 3/2004 | Stanley et al. | 324/663 |
| 7,521,940 B2 | 4/2009 | Koch et al. | |
| 2008/0186282 A1 | 8/2008 | Nix et al. | |
| 2009/0295199 A1 | 12/2009 | Kincaid et al. | |
| 2009/0295411 A1 | 12/2009 | Hansen | |
| 2011/0121618 A1 | 5/2011 | Fischer et al. | |
| 2011/0148648 A1 * | 6/2011 | Fischer et al. | 340/686.6 |

FOREIGN PATENT DOCUMENTS

| | | |
|---|---|---|
| EP | 2036764 A1 | 3/2009 |
| EP | 2090460 A1 | 8/2009 |
| JP | 10325136 A | 12/1998 |
| WO | 9217344 A1 | 10/1992 |
| WO | 9513204 A1 | 5/1995 |
| WO | 2008095939 A1 | 8/2008 |

OTHER PUBLICATIONS

International Search Report; International Application No. PCT/EP2011/054346; International Application Filing Date Mar. 22, 2011; Mail Date May 24, 2011.

Written Opinion; International Application No. PCT/EP2011/054346; International Application Filing Date Mar. 22, 2011; Mail Date May 24, 2011.

* cited by examiner

SEAT HEATER AND CAPACITIVE OCCUPANCY SENSOR COMBINATION

FIELD OF THE INVENTION

The present invention generally relates to a capacitive occupant detection system, e.g. for detecting the absence or presence of an occupant seated on a vehicle seat. More specifically, the invention relates to a combined seat heating and capacitively occupancy-sensing device.

BACKGROUND OF THE INVENTION

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode) capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

A disadvantage of the system disclosed in U.S. Pat. No. 6,703,845 is that the inductors used as AC-decoupling elements have to support the full heating current (up to 10 A DC and more) and present high AC impedance to the capacitive measurement circuit and the seat heater at the same time. High inductance and high operating DC current implies that the inductor have to be wound on large cores, which are expensive. Depending on the application chosen from U.S. Pat. No. 6,703,845, either two or four of these inductors have to be used.

BRIEF SUMMARY

The present invention provides a combined seat heater and capacitive occupancy sensor having the potential of more cost-efficient manufacture and improved detection performance.

A combined seat heater and (loading-mode) capacitive occupancy sensor, e.g. for a vehicle seat, comprises a heater network and a capacitive sensing network. The heater network includes a heating element connected between a first node and a second node to dissipate heat when a heating current is caused to flow between the first and second nodes. The capacitive sensing network is connected to the heating element to apply an oscillating current thereto and to derive a capacitive load of the heating element from a voltage resulting on the heating element in response to the application of the oscillating current. According to the invention, the heater network comprises a common mode choke connecting the first and the second node to a third and a fourth node, respectively. Furthermore, the capacitive sensing network comprises means to sustain an oscillating signal in or to drive an oscillating signal into the heating element as well as a high-impedance amplifier having an input node operatively connected to the heating element, e.g. via the first or second node, to probe the resulting oscillating voltage, and an output node to provide an output signal indicative of the oscillating voltage. Preferably, the capacitive sensing network derives not only the capacitive load of the heating element but also the resistive part of the complex impedance between the heating element and ground.

Generally speaking, the output signal of the high-impedance amplifier allows measuring the voltage present on the heating element substantially without disturbing the measurement by its presence. The output voltage of the high-impedance amplifier permits to derive the complex impedance and thus the capacitance between the heating element and ground. As the capacitance between the heating element and ground depends on whether there is or not a conductive body (e.g. an occupant) in proximity of the heating element, the occupancy state of the occupiable item (e.g. hospital bed, vehicle seat, office chair, etc.) containing the heating element can be derived from the output voltage of the high-impedance amplifier. As used herein, the term "impedance" designates the modulus (absolute value) of the complex impedance, which is itself defined as the ratio between (complex) voltage and (complex) current. When reference is made to the (complex) impedance to be measured or the capacitance to be measured, these terms designate the (complex) impedance or the capacitance between the heating element and the grounded counter-electrode (e.g. the vehicle frame). In the context of the present, the term "high-impedance amplifier" designates an amplifier, the complex impedance of which has a reactive part that is substantially higher (e.g. at least five times higher) than the reactive part of the complex impedance to be measured and a resistive part that is substantially higher (e.g. at least five times higher) than the resistive part of the complex impedance to be measured.

In the following, we will assume that the heating current is direct current (DC) and that the oscillating signal sustained or driven into the heating element is an AC signal within a frequency region well above DC level. This is insofar a simplification that transient states (e.g. switching on/or off of the heating current), noise and parasitic currents are not taken into account. It should be noted that the heating current need not be direct current in the strictest sense: it may be variable, but on a long time-scale, so as not to interfere with the oscillating signal used for the capacitive measurement. For sake of simplicity, we will use "DC" to designate slowly varying or constant signals. The oscillating signal preferably has a frequency in the range from about 100 kHz to about 10 GHz, more preferably in the range from about 500 kHz to about 30 MHz.

The capacitive sensing network preferably comprises a reference component having a known complex impedance (e.g. a reference capacitor, a reference inductor and/or a reference resistor) and a switch to operatively connect the reference component between the heating element and ground. The reference component may thus be connected in parallel with the complex impedance to be measured by closing the switch that is connected in series with the reference component. By probing the oscillating signal applied to the heating element when the switch is open and when the switch is closed, it is possible to reduce measurement errors due to production tolerances and drifts due to ageing and/or temperature variations of the circuit components. The reference component is preferably chosen such that its complex impedance remains substantially unaffected by temperature changes and ageing.

According to a preferred aspect of the invention, the heater network includes a further common mode choke connecting the third and the fourth node to a fifth and a sixth node, respectively, the fifth and sixth nodes being connectable to a power source for the heating network. The means to sustain an oscillating current in or to drive an oscillating current into the heating element may then comprise an AC voltage source that is AC-coupled to at least one of the third and fourth nodes. The common mode choke that connects the first and the second node to the third and the fourth node, respectively, thus forms a complex voltage divider with the complex impedance to measured. The high impedance amplifier probes the divided voltage. The complex impedance may thus be derived from the output signal of the high-impedance amplifier as the voltage applied by the AC voltage source and the inductance of the common mode choke are known. If necessary (e.g. of the voltage applied by the AC voltage source is not known a priori), the voltage on the at least one of the third and fourth nodes that the AC voltage source is connected to can be probed with a further high-impedance amplifier. If the inductance is unknown or subject to drift with time and/or temperature, one may use a reference capacitor as mentioned above to compute the complex impedance to be measured without knowledge of the inductance of the common mode choke closest to the heating element.

According to a further preferred aspect of the invention, the heating element has a capacitance to ground (the capacitance to be measured) so that the common mode choke connecting the first and second node with the third and fourth node, respectively, forms a parallel resonant network with the capacitance to be measured. According to this aspect of the invention, the means to sustain an oscillating current in or to drive an oscillating current into the heating element comprises a negative resistance device (e.g. the "active" or power-supplying part of an oscillator circuit) to sustain the oscillating current (at the resonance frequency) in the resonant network and to compensate for resistive losses and power extracted from the resonant network. The negative resistance device and the resonant network form together an oscillator, the resonance frequency of which depends on the inductance of the common mode choke that connects the first and second node with the third and fourth node, respectively, and on the capacitance to be measured. If the inductance is unknown or subject to drift with time and/or temperature, one may use a reference capacitor as mentioned above and compare the resonance frequency measured when the reference capacitor is switched in parallel to the capacitance to be measured and the resonance frequency measured when the reference capacitor is disabled.

Preferably, the capacitive sensing network comprises a feedback branch from the output node of the high-impedance amplifier to the negative resistance device to regulate the amplitude of the oscillating current to a reference amplitude.

According to yet a further preferred aspect of the invention, the means to sustain an oscillating current in or to drive an oscillating current into the heating element comprises an AC source operatively connected to the heating element to drive an alternating current into the resonant network and a frequency control unit for controlling the frequency of the alternating current. According to this aspect of the invention, the oscillation of the resonant network is constrained to oscillation at the frequency determined by the frequency control unit. Preferably, the latter frequency is equal to or close to the resonance frequency of the resonant network (preferably within the range from a tenth of to ten times the resonance frequency).

The complex impedance to be measured could be obtained from the complex impedance of the resonant network, which is given by the ratio of the complex voltage probed by the high-impedance amplifier and the complex current driven into the resonant network by the AC source.

Preferably, the frequency control unit is configured to vary the frequency of the alternating current within a frequency window. More preferably, the capacitive sensing network comprises a feedback branch from the output node of the high-impedance amplifier to the frequency control unit to regulate a phase difference of the output signal and the alternating current to a reference phase difference value. The reference phase difference value is preferably set to 0°, so that the feedback branch in fact regulates the frequency control unit to the resonance frequency of the resonant network.

Preferably, the first and second nodes are AC-coupled with one another and/or wherein the third and fourth nodes are AC-coupled with one another. Such AC-coupling is preferably achieved using a coupling capacitor. Any such coupling capacitors are chosen to have an impedance, which is substantially less than the impedance of the capacitance to be measured. The coupling capacitors thus represent shorts for the AC component of the current but isolate the DC component thereof. A coupling capacitor between the first and the second node ascertains that the capacitive occupancy sensor remains operational even if the heating element should break.

A preferred aspect of the present invention concerns a vehicle seat equipped with a combined seat heater and capacitive occupancy sensor.

Preferably, the combined seat heater and capacitive occupancy sensor comprises a driven shield electrode. As used herein, the term driven shield electrode designates an antenna electrode, which is kept at substantially the same AC potential as the heating element. As a consequence, the oscillating electric field substantially cancels between the driven shield electrode and the heating element. It follows that a driven shield electrode substantially prevents the heating element from capacitively coupling to objects, which, as seen from the heating element, lie behind the driven shield electrode. One or more driven shield electrodes may thus be used to focus the sensitivity of the heating element towards a region of interest, e.g. the part of space above a vehicle seat that is occupied by a normally seated occupant. To keep the driven shield electrode the same AC potential as the heating element, an amplifier with high input impedance and gain substantially equal to 1, commonly known as a voltage follower or buffer amplifier, may be connected between the heating element, e.g. at the first or second node, and the driven shield electrode to keep the driven shield electrode at the same AC potential as the heating element.

The coupling of the two windings of each common mode choke is important. For example, for a DC heating current of 10 A and a typical coupling factor of a common mode choke with windings wound separately (that is, not wound bifilarly) the coupling factor may be around 99%. In this case, the DC current generating a DC magnetic field in the common mode choke is equivalent to 100 mA. With typical core materials and a common mode choke inductance of 1 mH, for example, the shift of the operating point on the B-H curve of the common mode choke will already lead to a significant change of the inductance when the seat heater is switched on. Therefore, the inductance will be different between the states 'heater on' and 'heater off', which may lead to a error in the capacitive measurement when the seat heater is switched.

In order to reduce that problem as much as possible, the coupling of the common mode choke is preferably better than 99%. To achieve this, the common mode choke preferably has the wires that form the windings wound in a bifilar way. Even more preferably, the wires forming the windings of the common mode choke are twisted on one another (i.e. the twisted wires are wound around the core).

BRIEF DESCRIPTION OF THE DRAWINGS

Further details and advantages of the present invention will be apparent from the following detailed description of several not limiting embodiments with reference to the attached drawings, wherein.

DESCRIPTION OF PREFERRED EMBODIMENTS

Figure 1:
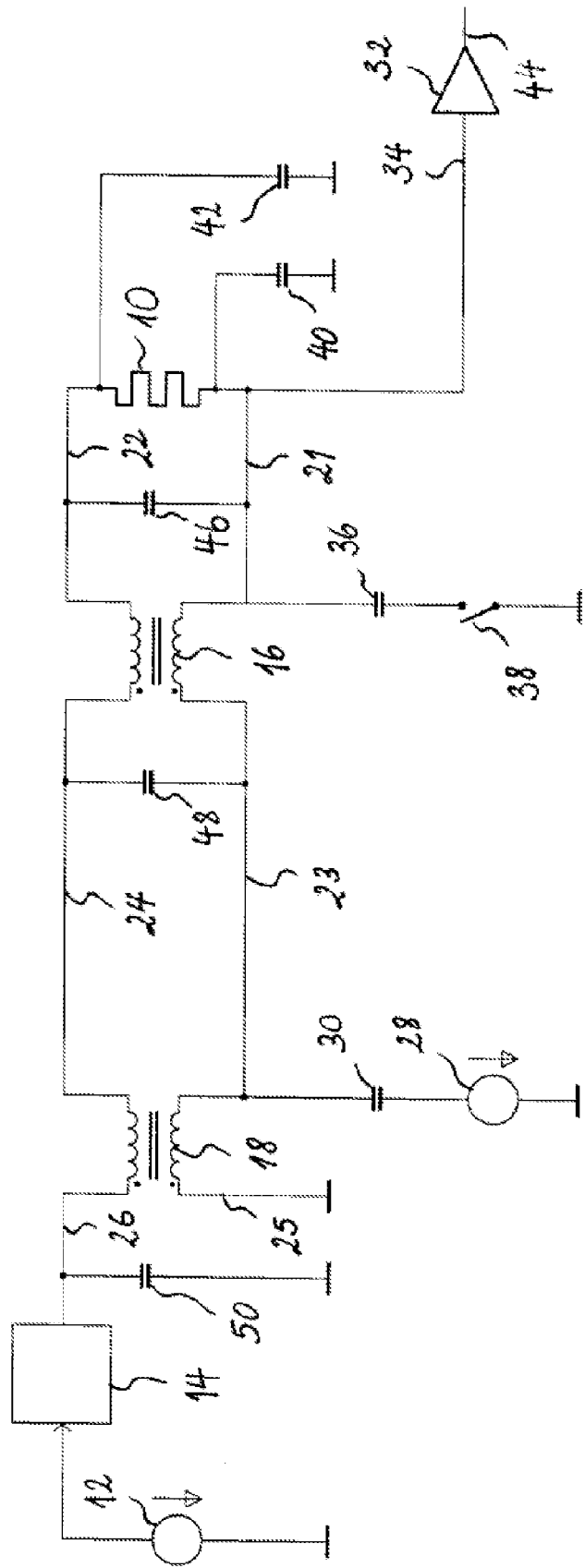
FIG. 1 is a schematic circuit diagram of a combined seat heater and capacitive occupancy sensor according to a first embodiment of the invention.

FIG. 1 shows a block schematic diagram of a combined seat heater and capacitive occupancy sensor according to a first embodiment of the invention. The seat heater comprises a heating element 10, which is used by the capacitive occupancy sensor as an antenna electrode, which capacitively couples to ground. The strength of the capacitive coupling between the heating element 10 and ground depends on whether an occupant is present in the zone between the heating element 10 and the grounded counter-electrode. In a loading-mode capacitive occupancy sensor for a vehicle seat, the grounded counter-electrode normally corresponds to the vehicle chassis.

Turning first to the seat heater, the heater network includes power source 12 supplying the required DC heating current to the heating element 10 to perform the heating function. The heater network comprises a switch 14, which turns the DC heating current on and off, depending on the actual and required temperature of the seat heater. The switch 14 may e.g. be controlled by a user-actuatable master switch (which activates or deactivates the seat heater as a whole) and control electronics (including e.g. a thermostat) that regulate the temperature to ascertain comfortable seating.

The heating element 10 is connected between a first 21 and a second 22 node. When there a potential difference is applied by the power supply between the first and the second nodes 21, 22, the heating current flows across the heating element 10, which is thus caused to dissipate heat. The heating element 10 is operatively connected to the power source 12 with a first common mode choke 16 which connects the first 21 and the second 22 node to a third 23 and a fourth 24 node, respectively, and a second common mode choke 18, which connects the third 23 and the fourth 24 node to a fifth 25 and a sixth 26 node, respectively. In FIG. 1, the fifth node 25 corresponds to ground, whereas the sixth node 26 is operatively connected to the high potential terminal of the power source 12 via the switch 14.

The common mode chokes 16, 18 exhibit low impedance to DC but substantial impedance to AC at the operating frequency of the capacitive occupancy sensor.

When the seat heater is supplied with DC heating current (i.e. when switch 14 is closed), current flows from power source 12 though switch 14, the node 26 herein designated as sixth node, the first winding of common mode choke 18, the node 24 herein designated as fourth node, the first winding of common mode choke 16, the node 22 herein designated as second node, the heating element 10, the node 21 herein designated as first node, the second winding of common mode chokes 16, the node 23 herein designated as third node, the second winding of common mode choke 18, to the node 25 herein designated as fifth node, which is tied to ground potential. The heating circuit is closed via the ground connection between the fifth node 25 and power source 12.

Switch 14 may be used to control the temperature of the seat by switching the seat heater on and off. A temperature sensor (not shown in the drawings) integrated in the seat may determine the seat temperature. A heating controller (e.g. a microcontroller) connected to switch 14 and to the temperature sensor reads the actual seat temperature from the temperature sensor and switches switch 14 on or off depending on the required temperature and the actually measured temperature. Such temperature control may be applied likewise to all the embodiments described herein.

The capacitive sensing network comprises an AC voltage source 28, which is AC-coupled by a coupling capacitor 30 to the third node 23 of the heating network, a high-impedance amplifier 32, the input node 34 of which is connected to the heating element 10 at the first node 21, and a reference capacitor 36, which is connected between the first node 21 and ground in series with a switch 38.

Capacitors 40 and 42 symbolically represent the capacitive coupling of the heating element 10 to a grounded electrode (typically the vehicle frame). The capacitance (and hence the impedance) of these capacitors 40, 42 depends on whether the space between the heating element 10 and the grounded electrode is occupied by a conductive body (e.g. an occupant) or not.

AC voltage source 28 applies an AC voltage to the third node 23 through coupling capacitor 30. The frequency of the AC voltage (oscillating voltage) may e.g. be chosen to be 1 MHz. The AC voltage applied to the third node 23 causes an AC current to flow to ground across common mode choke 16 and the capacitors 40, 42. The impedance of common mode choke 16 (mainly its inductance) thus forms together with the capacitance to be measured (the sum of the capacitances of capacitors 40, 42) a complex voltage divider dividing the AC voltage on the node first node 21. The divided AC voltage is probed with the high input impedance amplifier 32. High-impedance amplifier 32 provides on its output node 44 an output signal indicative of the AC voltage on the first node. The output signal may be further processed to derive the capacitance to be measured. This may e.g. be achieved by comparing the amplitude and the phase of the output signal with the amplitude and phase of the AC voltage applied to the third node.

Such comparison is preferably achieved by measuring the amplitude and phase of the AC voltage on the third node 23. The capacitance to be measured may then be determined based on the output AC voltage of high-impedance amplifier 32, the measured AC voltage on the third node and the known complex impedance of the common mode choke 16 at the frequency of the applied AC voltage.

Instead of measuring the voltage on the third node, the network may be designed in such a way that the amplitude of the AC voltage on the third node 23 takes a known value. According to this option, the capacitance of coupling capacitor 30 and the output impedance of AC voltage source 28 are preferably chosen substantially lower (preferably at least 10 times lower) than the impedance of common mode choke 18 and the impedance to be measured, so that the AC voltage on the third node is essentially equal to the AC voltage output by AC voltage source 28. The capacitance to be measured may then be determined based on the output AC voltage of high-impedance amplifier 32, the known AC voltage on the third node and the known complex impedance of the common mode choke 16 at the frequency of the applied AC voltage.

A refinement to the capacitive sensing network eliminates the need to know the complex inductance of common mode choke 16 beforehand. Such refinement is especially useful because ageing, temperature dependence and/or part tolerance could cause the actual complex impedance of the common mode choke 16 to deviate from the theoretical value used for the computation and lead to a measurement error of the unknown capacitance. The computation of the capacitance to be measured may be may independent on the complex impedance of the common mode choke 16 using the reference capacitor 36.

The reference capacitor 36 (having the known capacitance 43 Cref) is connected in series with electronic switch 38. The reference capacitor 36 and switch 38 are both connected between the first node 21 and ground.

The following procedure may e.g. be executed under control of a microcontroller. A first measurement of the complex voltage on output node 44 is made with the reference capacitor being switched off (switch 38 open). This complex voltage is stored (here as $U_{2A}$). A second measurement of the complex output voltage is made with the reference capacitor 36 being switched on (switch 38 closed). During the second measurement, the reference capacitor is connected in parallel to the capacitance to be determined. The complex voltage measured while the reference capacitor is connected is stored (here as $U_{2B}$). The complex voltage of the third node (known or measured) is designated by $U_1$. The complex impedance Zx of the capacitance to be measured may be calculated using:

$$A = \frac{U_{2A}}{U_1 - U_{2A}}$$

$$B = Zref * \frac{U_{2A} - U_{2B}}{U_{2B}}$$

$$Zx = B*(1+A)$$

where Zref is the complex impedance of the reference capacitor 36.

Obviously, Zref need not necessarily be the complex impedance of a capacitor. Accordingly, one could use any reference component having known complex impedance instead of the reference capacitor 36. The reference component could comprise a plurality of elements, e.g. resistors, inductors and/or capacitors.

The capacitive sensing network shown in FIG. 1 further comprises a coupling capacitor 46, which represents an AC shunt of the heating element 10. The impedance of capacitor 46 is chosen substantially smaller than the impedance of the total capacitance to be measured. In the absence of capacitor 46, an interruption (break) of the heating element 10 would result in a substantially smaller antenna electrode: this, in turn, would reduce the measurable capacitance. For instance, if heating element 10 shown in FIG. 1 breaks in the middle, only capacitance 40 would be measured by the measurement circuit. Coupling capacitor 46 achieves an AC short between the first and second nodes 21, 22, i.e. the terminals of the heating element 10. If a (single) break occurs in heating element 10, then the capacitive sensing network remains substantially unaffected and still measures the total capacitance between the heating element 10 and ground due to the AC shunt provided by capacitor 46. Coupling capacitor 48 provides an AC short between the third node 23 and the fourth node 24—it may be used alternatively or additionally to coupling capacitor 46. Coupling capacitor 50 provides an AC short between the fifth node 25 and the sixth node 26. Capacitor 50 avoids that any AC current coming from the AC signal source 28 is fed back into the DC power source 12 and thereby possibly into the car power network.

Additionally, an interruption of the heating element 10 can be detected by measuring the DC heating current when the seat heater is switched on. Alternatively, a DC test current which is substantially lower than the heating current can be injected in order to detect an interruption, for example while heating is not desired. A warning can be issued to the car user if the heating current does not flow or if the current that flows lies below a certain threshold.

Figure 2:
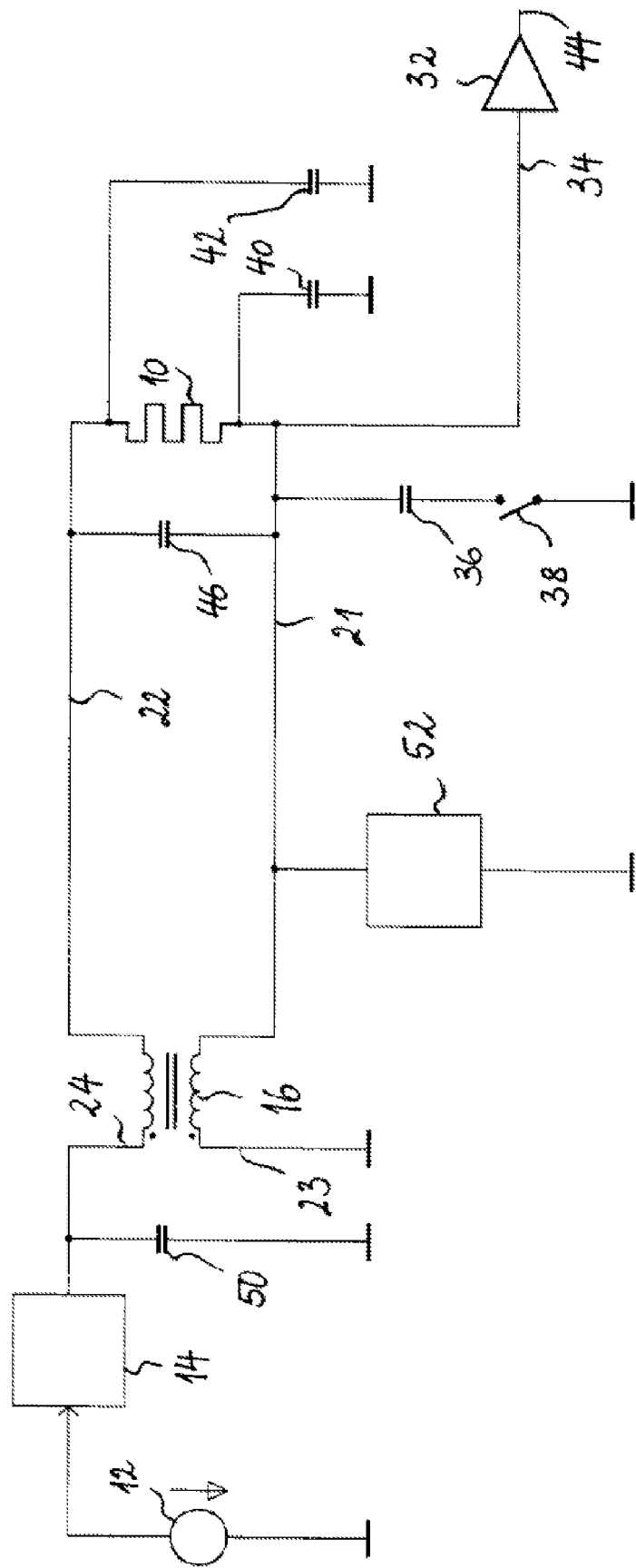
FIG. 2 is a schematic circuit diagram of a combined seat heater and capacitive occupancy sensor according to a second embodiment of the invention.

FIG. 2 shows a block schematic diagram of a combined seat heater and capacitive occupancy sensor according to a second embodiment of the invention. Elements common to the embodiments of FIG. 1 and FIG. 2, having the same or substantially the same function, have been given the same reference numbers in FIG. 2. As in the previously described embodiment, the seat heater comprises a heating element 10, which is used by the capacitive occupancy sensor as an antenna electrode, which capacitively couples to ground. The capacitance to be measured by the capacitive sensing network is again symbolically represented as capacitors 40 and 42.

In the heater network of the embodiment of FIG. 2, the heating element 10 is connected between a first 21 and a second 22 node. The heating element 10 is operatively connected to the power source 12 with a common mode choke 16 that connects the first 21 and the second 22 node to a third 23 and a fourth 24 node, respectively. In FIG. 2, the third node 23 corresponds to ground, whereas the fourth node 24 is operatively connected to the high potential terminal of the power source 12 via the switch 14. The common mode choke 16 exhibits low impedance to DC but substantial impedance to AC at the operating frequency of the capacitive occupancy sensor.

The capacitive sensing network comprises an a high-impedance amplifier 32, the input node 34 of which is connected to the heating element 10 at the first node 21, a reference capacitor 36, which is connected between the first node 21 and ground in series with a switch 38, and a negative resistance device 52 operatively connected to the heating element 10 at the first node 21.

Capacitors 40 and 42 are connected in parallel to the common mode choke 16 between the heating element 10 and ground. Accordingly, the common mode choke 16 and the capacitance to be measured form together a parallel resonant network, the resonance frequency of which depends on the capacitance to be measured.

Negative resistance device 52 is preferably the active, oscillation-sustaining part of an oscillator. It sustains an oscillating current in the resonant network by compensating for resistive losses, in such a way that the resonant network operates at or near to its resonance frequency.

The high input impedance amplifier 32 probes the AC voltage on the first node 21 and outputs a corresponding output signal on output node 44, which may then be processed further to derive the capacitance to be measured.

The complex impedance to be measured (and thus the capacitance to be measured) may be determined based on the frequency and the amplitude of the output signal, together with the known complex impedance of the common mode choke 16.

The impedance of capacitor 46 is chosen substantially smaller than the impedance of the total capacitance to be measured, so that the coupling capacitor shunts the heating element 10. The function and purpose of coupling capacitor 46 are the same as those explained with respect to FIG. 1. Coupling capacitor 50 provides an AC short between the fifth node 25 and the sixth node 26. Capacitor 50 avoids that AC current sustained in the resonant network is fed back into the DC power source 12 and thereby possibly into the car power network A problem which may arise when the inductance of a common mode choke is used as inductance of the parallel resonant LC tank together with the capacitance to be measured, is that the drift or temperature dependence or part tolerance of the inductance will lead to a measurement error of the unknown capacitance. The computation of the capacitance to be measured may be may independent on the complex impedance of the common mode choke 16 using the reference capacitor 36.

Reference capacitor 36 has a known capacitance (Cref) and is connected in series with an electronic switch 38 between the first node 21 and ground.

The following procedure may e.g. be executed under control of a microcontroller. A first measurement of the resonance frequency of the parallel resonant LC tank is made with the reference capacitor being switched off (switch 38 open). This frequency value is stored (here as fa). A second measurement of the resonance frequency is made with the reference capacitor switched on (switch 38 closed), i.e. connected in parallel to the capacitance to be measured. The so-obtained frequency value is stored (here as fb). The relations between the resonance frequencies and the inductive and capacitive components of the circuit may be expressed through:

$$fa = \frac{1}{2*\pi*\sqrt{L*Cx}}$$

$$fb = \frac{1}{2*\pi*\sqrt{L*(Cx+Cref)}}$$

where L is the inductance of the common mode choke, Cx is the capacitance to be measured and Cref is the known capacitance.

The two equations can be combined to yield Cx as a function of the measured frequencies fa and fb:

$$Cx = Cref * \frac{fb^2}{fa^2 - fb^2}$$

In the latter equation, the inductance L has been eliminated and thus does not influence the capacitance measurement.

This measurement procedure can also be applied to the implementations described hereinbelow.

Figure 3:
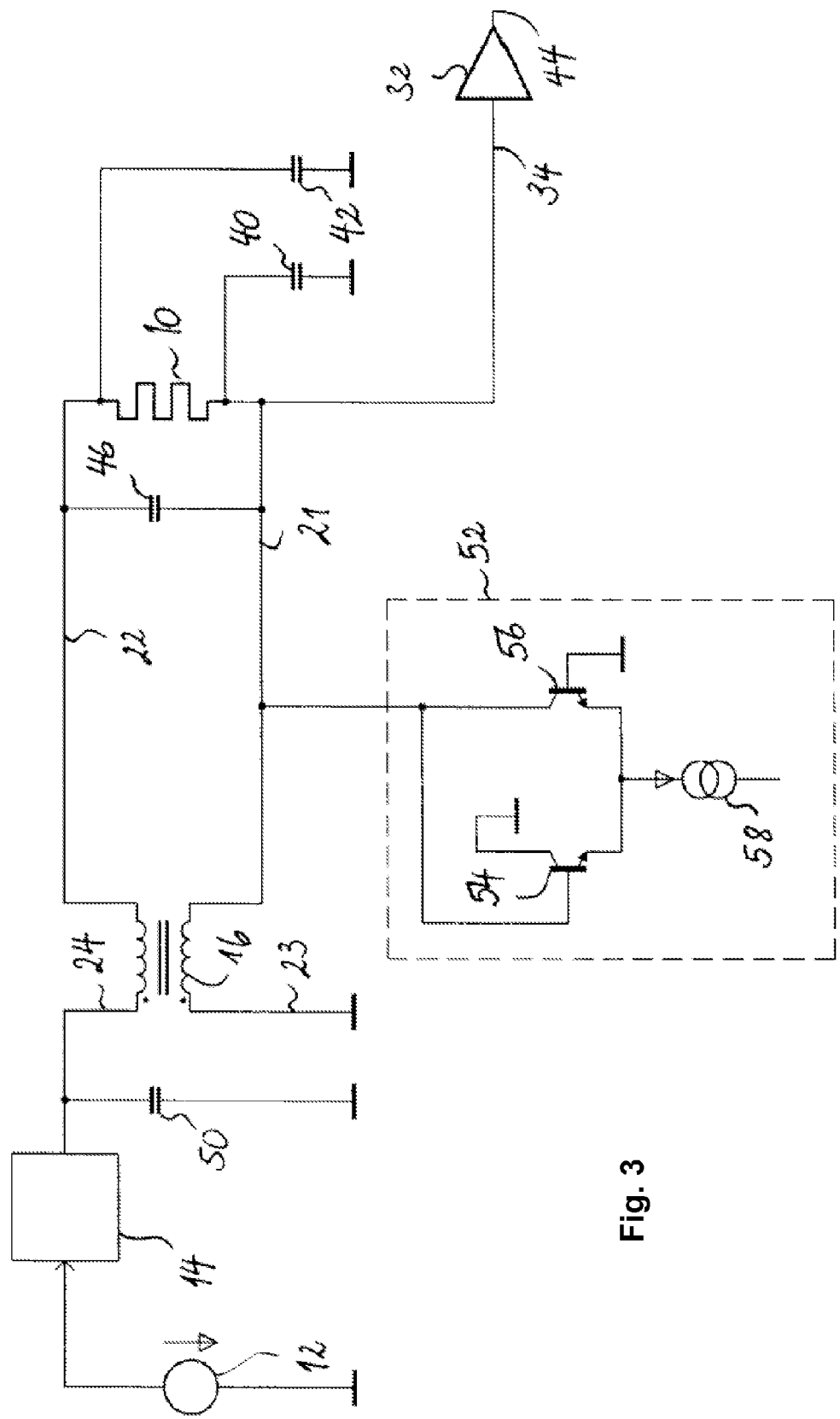
FIG. 3 is a schematic circuit diagram of a first variant of the embodiment of FIG. 2.

FIG. 3 shows a practical implementation of the circuit in FIG. 2. In particular, FIG. 3 illustrates a possible way to implement the negative resistance device 52 of FIG. 2. FIG. 3 thus uses the same reference numbers as FIG. 2 where appropriate. Elements that have already been discussed with reference to FIG. 2 will not be discussed again for sake of conciseness. In FIG. 3, the reference capacitor 36 and switch 38 are not shown. In any other respect, the implementation shown in FIG. 3 is configured and operates as described with respect to the embodiment of FIG. 2.

The negative resistance device 52 is the active, oscillation-sustaining part of an oscillator. It is the active part of an emitter-coupled LC oscillator and is comprised of transistors 54 and 56 and current sink 58. The circuit is taken from 'Tietze Schenk: Halbleiterschaltungstechnik 12.Auflage', page 878, FIG. 14.10. The same circuit is also implemented as oscillator core in the Motorola MC1684 'Voltage controlled oscillator' integrated circuit. Transistor 54 samples the voltage across the parallel resonating LC tank, and steers the current through transistor 56 via the common emitter connection. Current through transistor 56 is itself fed back via its collector into the parallel resonating LC tank, thereby sustaining the oscillation of the oscillator. Current sink 58 supplies the operating current to the circuit. A distinction is sometimes made between a current source and current sink. The former term then designates a device having a positive current flowing out of it, whereas "current sink" designates a device having a positive current flowing into it (or, likewise, a negative current flowing out of it). It the context of the present, taking into account that current is generally considered an algebraic quantity that can be positive and negative, the term "current sink" may also be a "current source".

The high-impedance amplifier probes the AC voltage on the first node 21 and outputs a corresponding output signal on its output node 44. If the supply current generated by current sink 58 is set to an appropriate value, the amplitude of the AC voltage on node 21 depends essentially only on the resistive component of the resonant network. The capacitance of the to be measured may then be calculated based on the frequency and amplitude of the output signal of high-impedance amplifier 32 and the known inductance of common mode choke 16. In addition, the resistive part of the complex impedance to be measured can be determined by measuring the amplitude of the output signal on node 44 and/or the DC power drawn by the current source 58 from its power supply.

Figure 4:
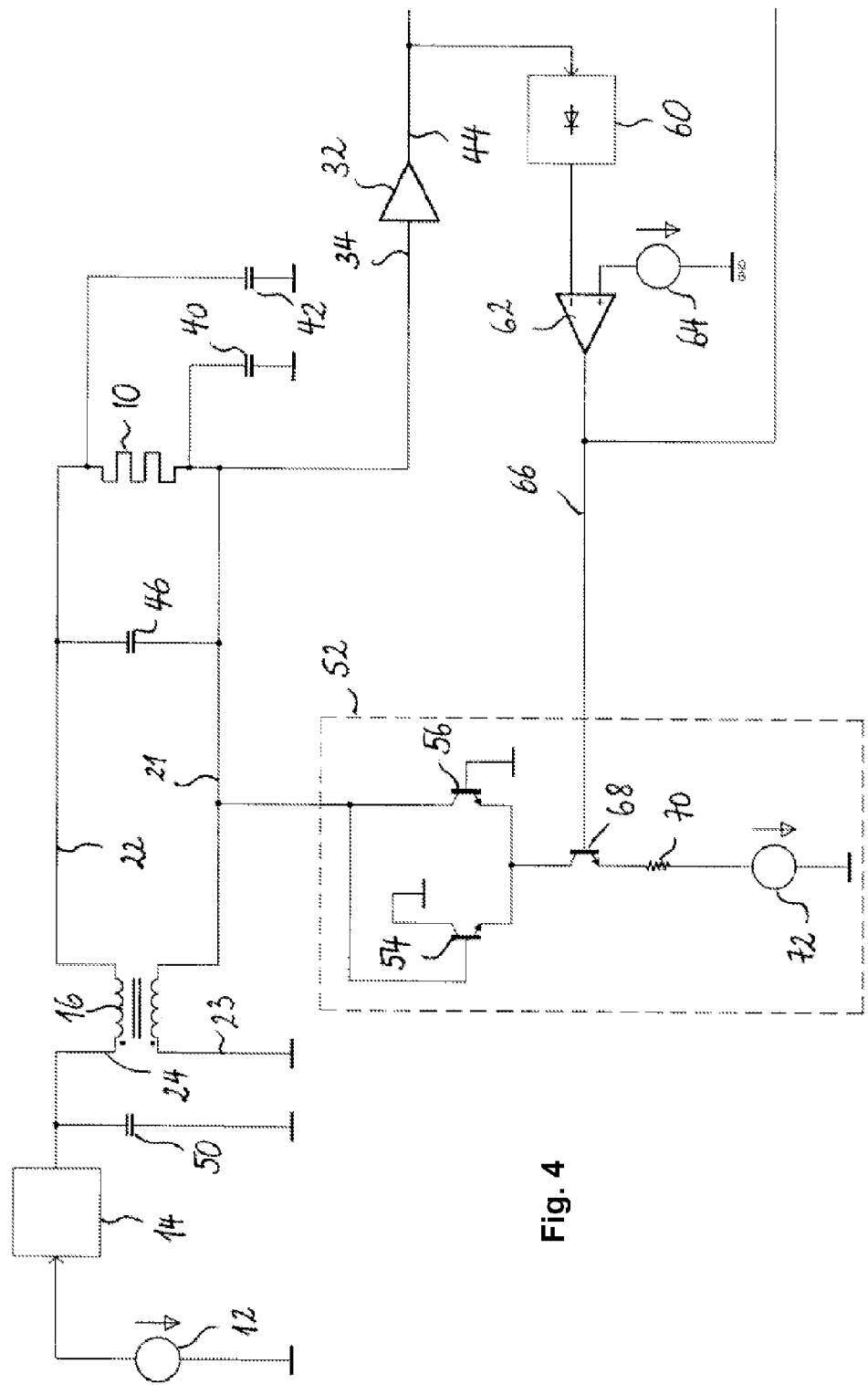
FIG. 4 is a schematic circuit diagram of a second variant of the embodiment of FIG. 2.

According to a further refinement of the implementation of FIG. 3, an 'automatic levelling loop' (e.g. as implemented in the Motorola MC1684 'Voltage controlled oscillator' integrated circuit mentioned above) is added to the oscillator. An implementation of such a loop is shown in FIG. 4. A rectifier 60 converts the peak amplitude of the output signal of high-impedance amplifier, which is proportional to the amplitude of the AC voltage at node 21 into a proportional DC voltage. An error amplifier 62 compares this DC voltage with a reference value defined by voltage source 64, and outputs a control voltage on its output node 66. That control voltage controls a current sink comprised of transistor 68, resistor 70 and bias voltage source 72 in such a way that the LC tank amplitude (the amplitude of the AC voltage on node 21) remains substantially constant. The magnitude of the current through the current sink around transistor 68 is then inversely responsive to the parallel resistive component of the parallel resonating LC tank. Since the control voltage of node 66 is substantially proportional to the current through the current sink, the control voltage of node 66 can be used to calculate the resistive value of the impedance to be determined.

Figure 5:
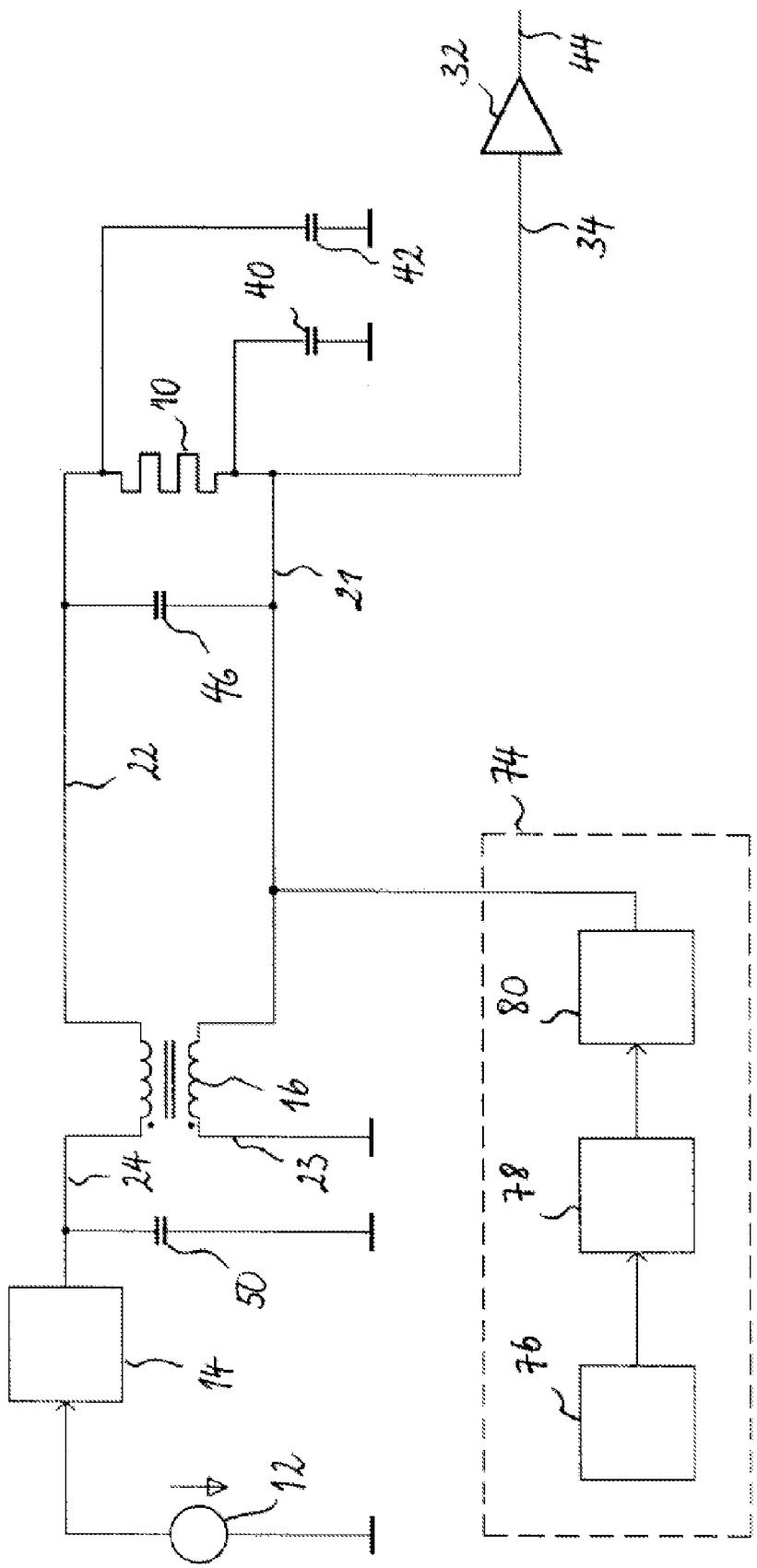
FIG. 5 is a schematic circuit diagram of a combined seat heater and capacitive occupancy sensor according to a third embodiment of the invention.

FIG. 5 shows a block schematic diagram of a combined seat heater and capacitive occupancy sensor according to a third embodiment of the invention. Elements common to the embodiments of FIG. 2 and FIG. 5, having the same or substantially the same function, have been given the same reference numbers in FIG. 5. As in the previously described embodiments, the seat heater comprises a heating element 10, which is used by the capacitive occupancy sensor as an antenna electrode, which capacitively couples to ground. The capacitance to be measured by the capacitive sensing network is again symbolically represented as capacitors 40 and 42. In the figures described in the following, the reference capacitor and its switch are not shown. Those skilled will appreciate, however, that such reference capacitor or other reference component could be used in the same manner as discussed with respect to FIG. 2.

In the embodiment of FIG. 5, an AC source 74 supplying an AC current into the resonant network, operating at or near the resonance frequency of the resonant network is connected to the first node 21. AC source 74 comprises a microcontroller 76, a controlled oscillator 78 (for example a digital direct synthesizer, commonly called DDS) and a voltage-controlled current source 80. Microcontroller 76 sets the frequency of the DDS 78 by setting the appropriate frequency setting registers of the DDS 78. DDS 78 outputs a sine wave voltage, which the voltage-controlled current source 80 converts to a proportional current. The voltage-controlled current source 80 can e.g. be implemented using an operational transconductance amplifier, such as the OPA861 integrated circuit manufactured by Texas Instruments Inc. Microcontroller 76 sweeps the frequency of the DDS generator through a frequency range around the resonance frequency of the resonant network. By measuring the frequency at which the amplitude of the output signal at node 44 is maximal, or by measuring the frequency at which the phase difference between the output signal at node 44 and the output voltage of DDS 78 or the current output by voltage-controlled current source 80 is substantially zero, the resonance frequency is found. The capacitance to be measured may then be calculated based on the known inductance of the common mode choke and the resonance frequency found. At the resonance frequency, amplitude of the output signal at node 44 is indicative of the real part (i.e. the resistive part) of the impedance to be measured. If the complex impedance of the common mode choke is unknown or too uncertain, one may use a reference capacitor in a manner analogous to that described hereinbefore to eliminate the complex impedance of the common mode choke.

Figure 6:
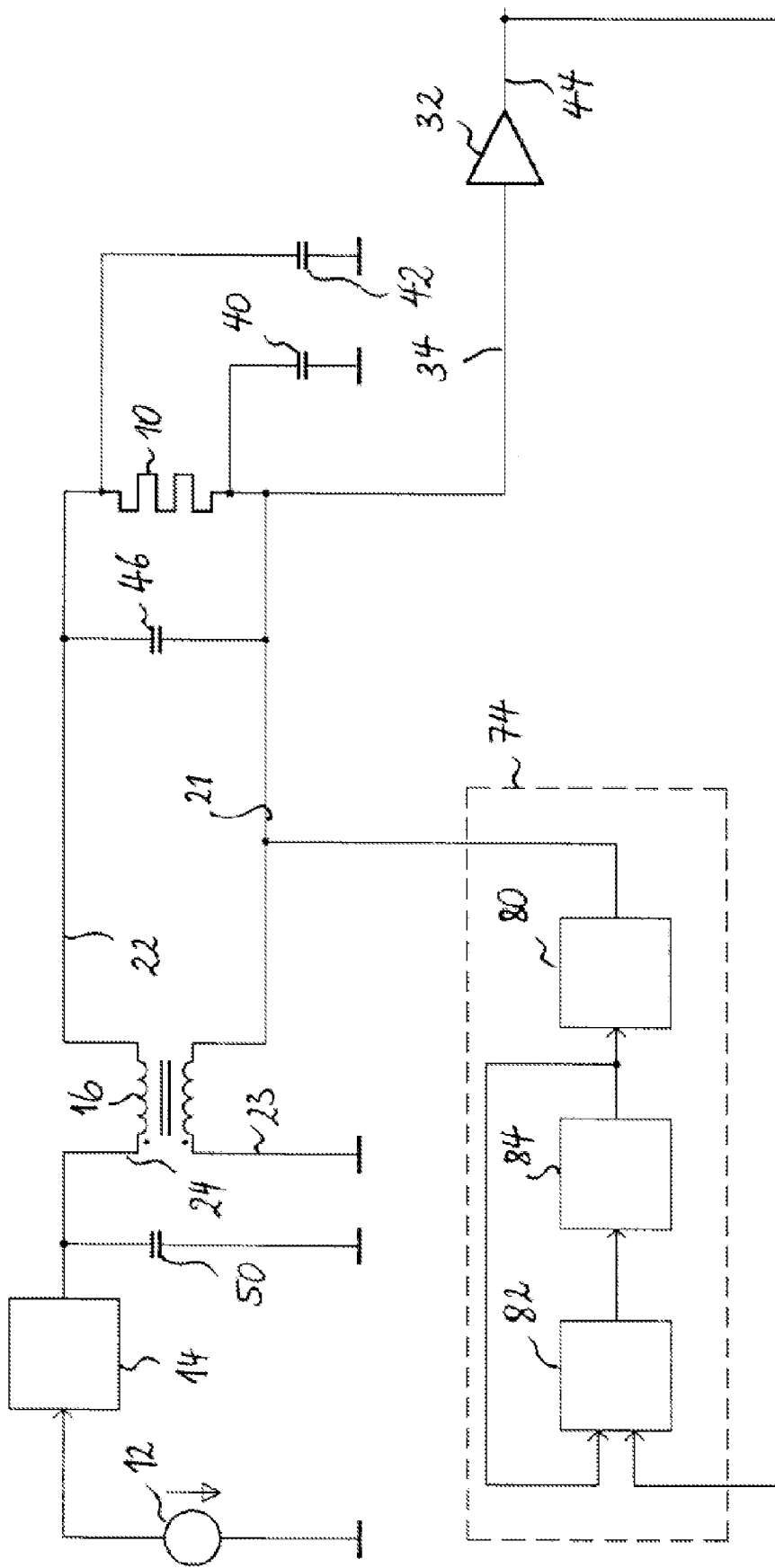
FIG. 6 is a schematic circuit diagram of a variant of the embodiment of FIG. 5.

FIG. 6 shows a variant of the embodiment of FIG. 5. The capacitive sensing network comprises a feedback branch from the output node 44 of said high-impedance amplifier 32 to the AC source. The purpose of the feedback loop is to regulate the phase difference between the output signal on node 44 and the alternating current generated by the AC source to a reference phase difference value of 0°. The phase difference between the output signal on node 44 and the signal generated by the AC source is measured by an edge sensitive phase detector 82, which receives at its inputs the output signal of node 44 and the AC control voltage that controls the voltage-controlled current source 80. Edge sensitive phase detector 82 integrates the phase difference between its input signals and produces an error signal, which is fed to voltage-controlled oscillator 84. The level of the error signal varies as long as there is a phase difference between the input signals of edge sensitive phase detector 82 and causes the voltage-controlled oscillator output an AC control voltage the frequency of which progressively approaches the frequency at which the phase difference finally cancels. This frequency corresponds to the resonance frequency of the resonant network. The edge sensitive phase detector 82 and the voltage-controlled oscillator may e.g. be implemented in the way of the phase comparator II and the VCO parts, respectively, of the 'CMOS micropower phase locked loop' integrated circuit CD4046, manufactured by Texas Instruments Inc. Voltage-controlled current source 80 may e.g. be implemented using an operational transconductance amplifier, such as the OPA861 integrated circuit manufactured by Texas Instruments Inc. The capacitive sensing network of FIG. 6 thus operates at the resonance frequency of the resonant network. Except for transients, the frequency of the output signal is thus equal to the resonance frequency, which depends on the capacitance to be measured. Accordingly, the capacitance to be measured may be determined in the same way as described with respect to FIG. 2.

As will be appreciated, in all of the above-described embodiments, the capacitive sensing network may be operated at the same time as or a different time than the seat heater.

Figure 7:
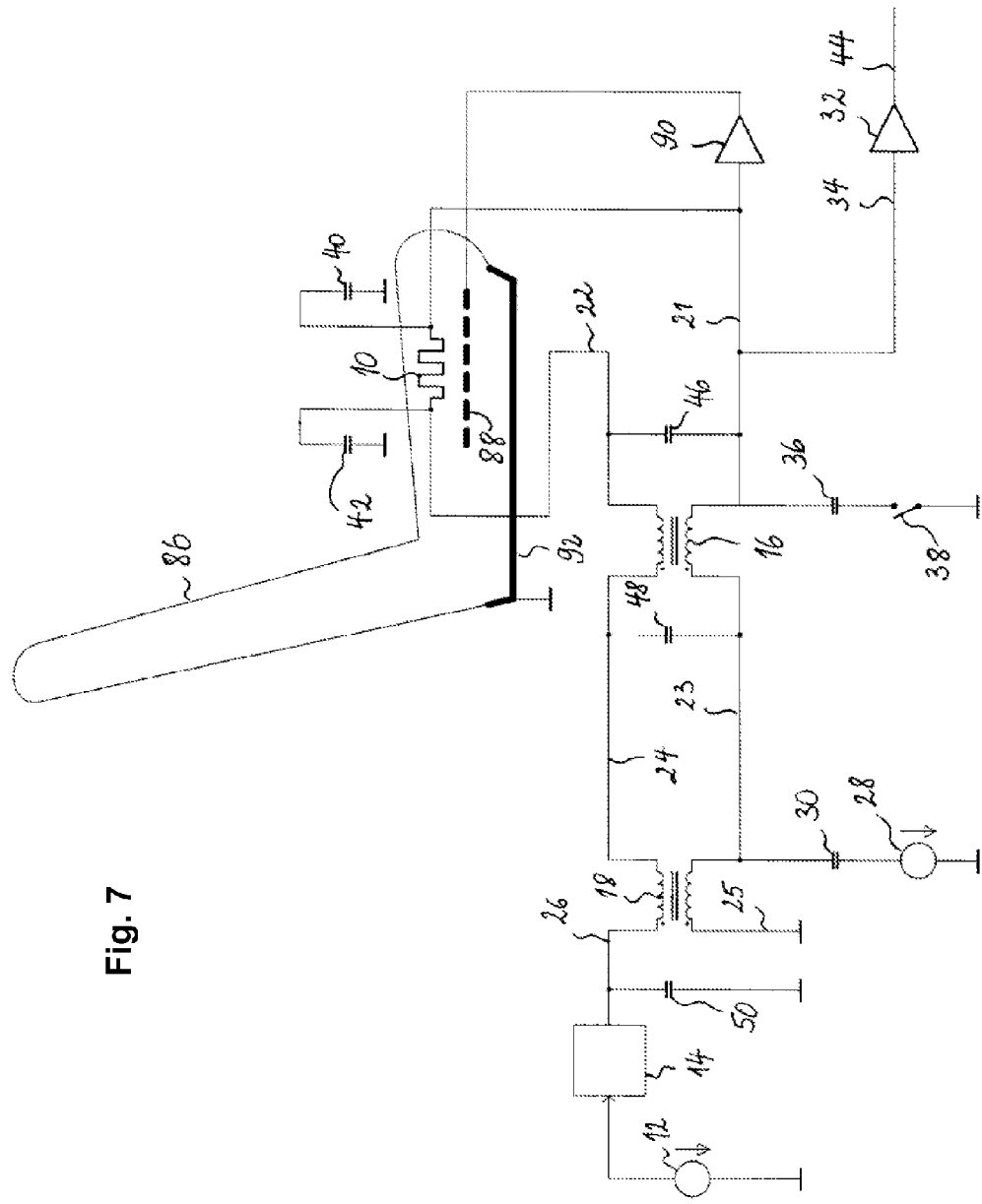
FIG. 7 is a schematic illustration of a vehicle seat equipped with a combined seat heater and capacitive occupancy sensor substantially as in FIG. 1.

FIG. 7 schematically shows a vehicle seat 86 equipped with a combined seat heater and capacitive occupancy sensor, which essentially corresponds to the one shown in FIG. 1, except for the driven shield electrode (or guard electrode) 88 connected to the first node 21 via a voltage follower 90.

Heating element 10 is arranged in seat 86, more specifically underneath the seating surface. In addition to the capacitance or impedance to be measured (illustrated again by capacitors 40 and 42), there is an additional capacitance between the heating element 10 and the seat frame 92. The additional capacitance is in parallel to the capacitance to be measured and may introduce considerable measurement errors, because it is not well known and may vary during the lifetime of the application. In order to suppress the influence of the additional capacitance, a guard electrode 88 is arranged between the seat heater 10 and the seat frame 92. The guard electrode 88 may e.g. be a conductive foil or textile, which covers at least the area spanned by the heating element 10. Preferably the guard electrode 88 is larger than the area spanned by the heating element 10 for better shielding. As indicated above, the guard electrode 88 is electrically connected to via voltage follower 90. Voltage follower 90 has high input impedance in order not to disturb the measurement. The voltage follower 90 keeps the voltage on the guard electrode 88 substantially equal to the voltage on the heating element. Therefore, when the capacitive measurement is carried out, there is no or only a very small AC voltage difference between the heating element 10 and the guard electrode 88. As a result, substantially no AC current flows between the heating element 10 and the guard electrode 88. The guard electrode 88 being arranged between the heating element 10 and the seat frame 92, substantially no AC current flows between the heating element 10 and the seat frame 92.

Figure 8:
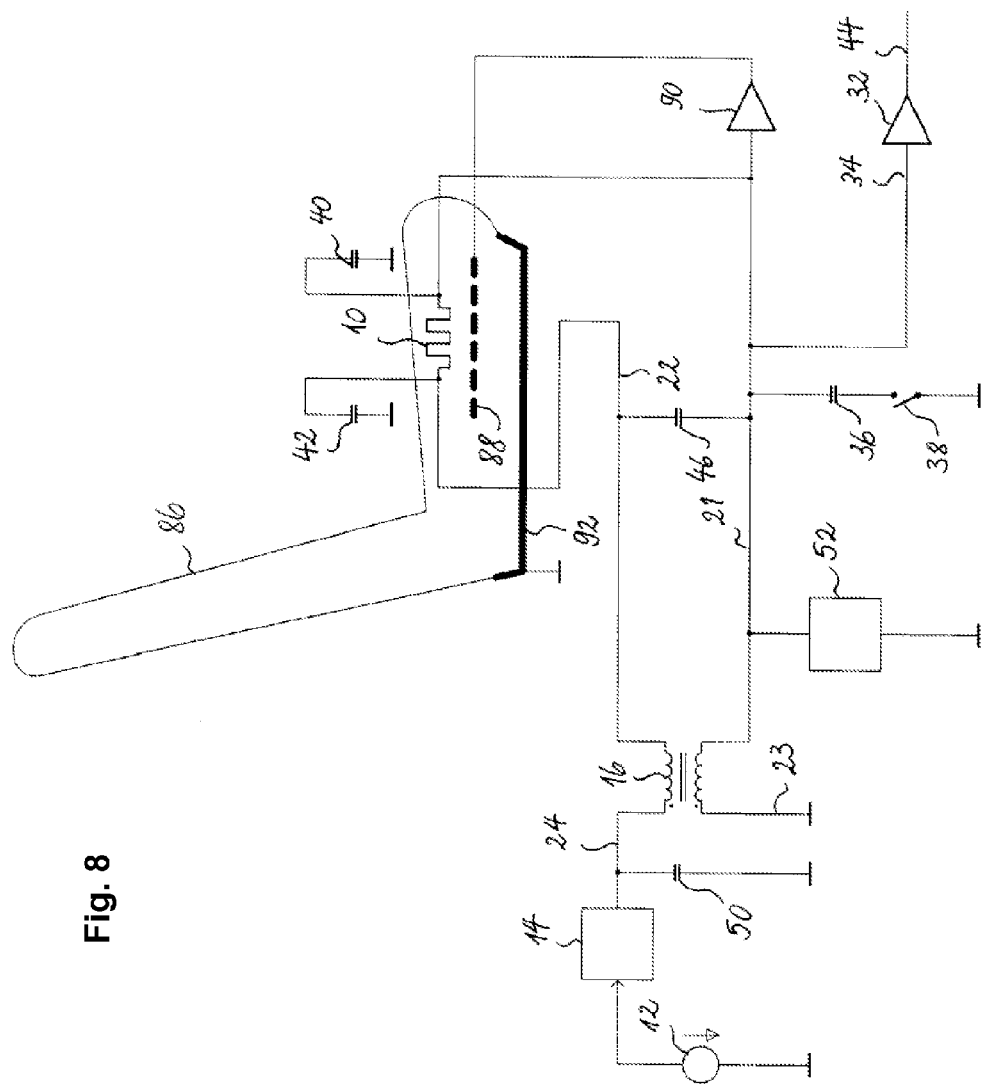
FIG. 8 is a schematic illustration of a vehicle seat equipped with a combined seat heater and capacitive occupancy sensor substantially as in FIG. 2.

FIG. 8 schematically shows a vehicle seat 86 equipped with a combined seat heater and capacitive occupancy sensor, which essentially corresponds to the one shown in FIG. 2, except for the driven shield electrode (or guard electrode) 88 connected to the first node 21 via a voltage follower 90. The system operates in the same way as the system of FIG. 2. The function and the mode of operation of the guard electrode 88 is the same as described with respect to FIG. 7.

In FIGS. 1 to 8, switch 14 is connected between the positive terminal of the power source 12 and the heating element 10. Obviously, the heater network would also work if the switch 14 were connected to between the negative terminal of the power source 12 and the heating element 10. In this case, however, some of the capacitive sensing networks described hereinabove have to be adapted to work with a switched negative power supply.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. Combined seat heater and capacitive occupancy sensor, comprising
   a heater network including a heating element connected between a first node and a second node to dissipate heat when a heating current is caused to flow between said first and second nodes,
   a capacitive sensing network connected to said heating element configured to apply an oscillating current thereto and to derive a complex impedance of said heating element from a voltage resulting on said heating element in response to said application of said oscillating current;
   wherein said heater network comprises a common mode choke connecting said first and said second node to a third and a fourth node, respectively, and wherein said capacitive sensing network comprises
   means to sustain said oscillating current in or to drive said oscillating current into said heating element;
   as well as a high-impedance amplifier having an input node operatively connected to said heating element, to probe said voltage, and an output node to provide an output signal indicative of said voltage, said high-impedance amplifier having a complex impedance with a reactive part and a resistive part, the reactive part of the complex impedance of the high-impedance amplifier being at least five times higher than a reactive part of the complex impedance of said heating element and the resistive part of the complex impedance of the high-impedance amplifier being at least five times higher than a resistive part of the complex impedance of said heating element.

2. Combined seat heater and capacitive occupancy sensor as claimed in claim 1, wherein said capacitive sensing network comprises a reference component having a known complex impedance and a switch to operatively connect said reference component between said heating element and ground.

3. Combined seat heater and capacitive occupancy sensor as claimed in claim 1, wherein said heater network includes a further common mode choke connecting said third and said fourth node to a fifth and a sixth node,
respectively, said fifth and sixth nodes being connectable to a power source for said heating network.

4. Combined seat heater and capacitive occupancy sensor as claimed in claim 3, wherein said means to sustain said oscillating current in or to drive said oscillating current into said heating element comprises a AC voltage source that is AC-coupled to at least one of said third and fourth nodes.

5. Combined seat heater and capacitive occupancy sensor as claimed in claim 1, wherein said heating element has a capacitance to ground, said common mode choke forming a parallel resonant network with said capacitance.

6. Combined seat heater and capacitive occupancy sensor as claimed in claim 5, wherein said means to sustain said oscillating current in or to drive said oscillating current into said heating element comprises a negative resistance device to sustain an oscillating current in said resonant network and to compensate for resistive losses and power extracted from said resonant network.

7. Combined seat heater and capacitive occupancy sensor as claimed in claim 6, wherein said capacitive sensing network comprises a feedback branch from the output node of said high-impedance amplifier to said negative resistance device to regulate an amplitude of said oscillating current to a reference amplitude.

8. Combined seat heater and capacitive occupancy sensor as claimed in claim 5, wherein said means to sustain said oscillating current in or to drive said oscillating current into said heating element comprises an AC source operatively connected to said heating element to drive an alternating current into said resonant network and a frequency control unit for controlling the frequency of said alternating current.

9. Combined seat heater and capacitive occupancy sensor as claimed in claim 8, wherein said frequency control unit is configured to vary the frequency of said alternating current within a frequency window.

10. Combined seat heater and capacitive occupancy sensor as claimed in claim 8, wherein said capacitive sensing network comprises a feedback branch from the output node of said high-impedance amplifier to said frequency control unit to regulate a phase difference of said output signal and said alternating current to a reference phase difference value.

11. Combined seat heater and capacitive occupancy sensor as claimed in claim 10, wherein said reference phase difference value is 0°.

12. Combined seat heater and capacitive occupancy sensor as claimed in claim 1, wherein said first and second nodes are AC-coupled with one another and/or wherein said third and fourth nodes are AC-coupled with one another.

13. Vehicle seat, comprising a combined seat heater and capacitive occupancy sensor as claimed in claim 1.

14. Vehicle seat as claimed in claim 13, wherein said combined seat heater and capacitive occupancy sensor comprises a driven shield electrode.

15. Vehicle seat as claimed in claim 13, comprising a voltage follower connected between said heating element and said driven shield electrode to keep said driven shield electrode at the same AC potential as said heating element.

16. Combined seat heater and capacitive occupancy sensor, comprising a heater network including a heating element connected between a first node and a second node to dissipate heat when a heating current is caused to flow between said first and second nodes,
a capacitive sensing network connected to said heating element configured to apply an oscillating current thereto and to derive a complex impedance of said heating element in response to said application of said oscillating current,
wherein said heater network comprises a common mode choke connecting said first and said second node to a third and a fourth node, respectively,
wherein said common mode choke comprises inductively coupled windings having a coupling factor of more than 99%; and,
wherein said capacitive sensing network comprises means to sustain said oscillating current in or to drive said oscillating current into said heating element and a high-impedance amplifier having an input node operatively connected to said heating element, to probe said voltage, and an output node to provide an output signal indicative of said voltage, said high-impedance amplifier having a complex impedance with a reactive part and a resistive part, the reactive part of the complex impedance of the higher-impedance amplifier being at least five times higher than a reactive part of the complex impedance of said heating element and the resistive part of the complex impedance of the high-impedance amplifier being at least five times higher than a resistive part of the complex impedance of said heating element.

17. Combined seat heater and capacitive occupancy sensor, comprising
a heater network including a heating element connected between a first node and a second node to dissipate heat when a heating current is caused to flow between said first and second nodes,
a capacitive sensing network connected to said heating element configured to apply a oscillating current thereto and to derive a complex impedance of said heating element from a voltage resulting on said heating element in response to said application of said oscillating current,
wherein said heater network comprises a common mode choke connecting said first and said second node to a third and fourth node, respectively,
and wherein said common mode choke comprises inductively coupled windings formed by wires wound in bifilar way; and
wherein said capacitive sensing network comprises means to sustain said oscillating current in or to drive said oscillating current into said heating element;
said a high-impedance amplifier having an input node operatively connected to said heating element, to probe said voltage, and an output node to provide an output signal indicative of said voltage, said high-impedance amplifier having a complex impedance with a reactive part and a resistive part, the reactive part of the complex impedance of the high-impedance amplifier being at least five times higher than a reactive part of the complex impedance of said heating element and the resistive part of the complex impedance of the high-impedance amplifier being at least five times higher than a resistive part of the complex impedance of said heating element.

* * * * *